United States Patent
Li et al.

(10) Patent No.: US 10,690,959 B2
(45) Date of Patent: Jun. 23, 2020

(54) DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jinpeng Li, Beijing (CN); Ming Zhai, Beijing (CN); Pei Li, Beijing (CN); Dan Li, Beijing (CN); Pengjun Cao, Beijing (CN); Zongying Shu, Beijing (CN); Yongqiang Jiang, Beijing (CN); Zhiyuan Wang, Beijing (CN); Zhiyong Chen, Beijing (CN); Yinwei Chen, Beijing (CN); Xiang Li, Beijing (CN); Guangquan Wang, Beijing (CN); Haiwei Sun, Beijing (CN); Enkai Dong, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/333,972

(22) PCT Filed: Nov. 29, 2018

(86) PCT No.: PCT/CN2018/118139
§ 371 (c)(1),
(2) Date: Mar. 15, 2019

(87) PCT Pub. No.: WO2019/205627
PCT Pub. Date: Oct. 31, 2019

(65) Prior Publication Data
US 2019/0331960 A1    Oct. 31, 2019

(30) Foreign Application Priority Data
Apr. 26, 2018 (CN) .......................... 2018 1 0385295

(51) Int. Cl.
*G02F 1/1335* (2006.01)
*G02F 1/1333* (2006.01)
*G02F 1/13357* (2006.01)

(52) U.S. Cl.
CPC .. *G02F 1/133528* (2013.01); *G02F 1/133308* (2013.01); *G02F 1/133512* (2013.01); *G02F 1/133615* (2013.01)

(58) Field of Classification Search
CPC .................................................. G02F 1/133528
See application file for complete search history.

(56) References Cited

U.S. PATENT DOCUMENTS 6,847,428 B1 * 1/2005 Sekiguchi ............. G02F 1/1334
349/139
2012/0105400 A1 * 5/2012 Mathew ............... H04N 5/2251
345/207
(Continued)

FOREIGN PATENT DOCUMENTS

| CN | 106973212 A | 7/2017 |
|---|---|---|
| CN | 107272242 A | 10/2017 |

(Continued)

OTHER PUBLICATIONS

International Search Report and Written Opinion dated Feb. 11, 2019 in PCT/CN2018/118139.
First Office Action dated Mar. 3, 2020 in CN201810385295.7.

*Primary Examiner* — Edmond C Lau
(74) *Attorney, Agent, or Firm* — Syncoda LLC; Feng Ma

(57) ABSTRACT

A display apparatus includes a display module and a camera module. The camera module is within a display area of the display module, and the camera module is over a side of the (Continued)

display module distal to a light-emitting surface of the display module. The display area of the display module includes a light-incident region positionally corresponding to a lens of the camera module, wherein the light-incident region is configured to allow lights from a side of the display apparatus proximal to the light-emitting surface of the display module to pass therethrough to thereby enter the lens of the camera module. The display apparatus further includes a backlight portion over a side of the display module distal to the light-emitting surface of the display module, and the camera module is arranged inside a mounting hole in the backlight portion.

17 Claims, 5 Drawing Sheets

(56) References Cited

U.S. PATENT DOCUMENTS

| | | | |
|---|---|---|---|
| 2014/0063407 A1* | 3/2014 | Kwon | G02F 1/1339 349/58 |
| 2017/0075174 A1* | 3/2017 | Lee | G02F 1/13394 |
| 2017/0187934 A1* | 6/2017 | Kwak | H04N 5/2251 |
| 2019/0258112 A1* | 8/2019 | Nagasaki | G02F 1/1333 |
| 2019/0310501 A1* | 10/2019 | Nagata | G02F 1/133371 |

FOREIGN PATENT DOCUMENTS

| | | |
|---|---|---|
| CN | 207264062 U | 4/2018 |
| CN | 108885376 A | 11/2018 |

* cited by examiner

DISPLAY APPARATUS

CROSS-REFERENCE TO RELATED APPLICATION

The present application claims priority to Chinese Patent Application No. 201810385295.7 filed on Apr. 26, 2018, the disclosure of which is hereby incorporated by reference in its entirety.

TECHNICAL FIELD

The present disclosure relates generally to a field of display technologies, and specifically to a display apparatus.

BACKGROUND

Camera module is one of the important structures that is often integrated in display apparatuses such as laptops and mobile phones. Usually, the camera(s) in a camera modules is/are configured outside a display region of the display panel (i.e. display screen), and as a result, the area that is occupied by the display screen is reduced.

At present time, in order to improve the area that the display screen occupies, some manufacturers have adopted a compartment design for arranging certain part of the display screen for camera modules and other part of the display screen for display region. Typically a region of a rectangular-shaped display screen is cut for arranging a camera module in the display apparatus, and an irregular-shaped display screen is thus obtained as a result.

However, the manufacturing efficiency of this above irregular-shaped compartment design is relatively low, and problems and issues easily occur during the manufacturing process.

SUMMARY

The present disclosure provides a display apparatus. The display apparatus comprises a display module and a camera module.

The camera module is within a display area of the display module, and the camera module is over a side of the display module distal to a light-emitting surface of the display module. The display area of the display module comprises a light-incident region positionally corresponding to a lens of the camera module, wherein the light-incident region is configured to allow lights from a side of the display apparatus proximal to the light-emitting surface of the display module to pass therethrough to thereby enter the lens of the camera module.

The display apparatus can further include a backlight portion over a side of the display module distal to the light-emitting surface of the display module, and the camera module can accordingly be arranged inside a mounting hole in the backlight portion.

Herein, the camera module can optionally further include a convex portion at an end of the camera module facing the display module, and the convex portion is configured to ensure that the lens of the camera module has a distance to the display module.

According to some embodiments of the display apparatus, the convex portion comprises a ring having an opening thereof positionally corresponding to the lens of the camera module. The opening is configured to allow the lights passing through the light-incident region of the display module to pass therethrough to thereby enter the lens of the camera module.

The display apparatus can optionally further comprise an adhesive portion between the camera module and a side wall of the mounting hole.

Herein, the adhesive portion can be non-light-transmissive.

According to some embodiments of the disclosure, the display apparatus further includes a first adhesive layer between the convex portion and the display module.

Optionally in the display apparatus, the backlight portion can comprise a backboard over a side thereof distal to the display module, and can also comprise a mounting component fixedly attached onto the backboard. Herein, the mounting hole passes through the backboard, and the mounting component is configured to fixedly mount the camera module with the display module by attaching an end portion of the camera module distal to the lens.

Further optionally, the mounting component can be provided with a mounting slot at a surface thereof proximal to the display module, and the end portion of the camera module extends into the mounting slot to thereby attach with the mounting component.

In any one of the embodiments of the display apparatus described above, the display module can include a liquid crystal cell. The liquid crystal cell comprises an array substrate, a liquid crystal layer, and an opposing substrate, which are sequentially stacked over one another along a direction of light transmission.

Herein, according to some embodiments of the display apparatus, the liquid crystal layer can cover regions of the display areas other than the light-incident region.

According to some other embodiments of the display apparatus, the liquid crystal layer can cover the light-incident region. Herein, the display module can optionally further include a driving electrode layer at a position of the liquid crystal cell corresponding to the light-incident region, and the driving electrode layer is configured to generate an electric field in a portion of the liquid crystal layer positionally corresponding to the light-incident region to drive liquid crystal molecules in said portion of the liquid crystal layer to deflect to thereby realize a zooming of the lens of the camera module.

According to some embodiments, the electric field generated by the driving electrode layer is independent from any of electric fields generated in portions of the liquid crystal layer positionally corresponding to regions of the display area other than the light-incident region.

In the display apparatus disclosed herein, the display module can further comprise a first alignment layer between the array substrate and the liquid crystal layer, and a second alignment layer between the opposing substrate and the liquid crystal layer.

In the display apparatus, the liquid crystal cell can further comprise a transparent spacer between the array substrate and the opposing substrate.

Herein, according to some embodiments, the transparent spacer is arranged to positionally correspond to the light-incident region, and according to some other embodiments, the transparent spacer is absent in the light-incident region.

In the display apparatus, the liquid crystal cell can further comprise a first polarizer over a side of the array substrate distal to the opposing substrate, and a second polarizer over a side of the opposing substrate distal to the array substrate. The first polarizer is provided with a first light-transmissive window at a position thereof corresponding to the light-incident region; and the second polarizer is provided with a second light-transmissive window at a position thereof corresponding to the light-incident region.

Herein, according to some embodiments, at least one of the first light-transmissive window and the second light-transmissive window comprises a light-transmissive opening. According to some other embodiments, at least one of the first light-transmissive window and the second light-transmissive window comprises a light-transmissive material.

It is noted that the light-transmissive opening described herein and throughout the disclosure is referred to as a case where there is absence of any solid material (e.g. a light-transmissive material) in the position for the at least one of the first light-transmissive window and the second light-transmissive window.

The light-transmissive material can be a transparent material that is filled within an opening in the first/second polarizer that positionally corresponds to the light-incident region, or can be a material which is substantially same or similar to the first/second polarizer, but is treated to be transparent at the region corresponding to the light-incident region.

BRIEF DESCRIPTION OF DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of the embodiments disclosed herein, the technical solutions of the embodiments of the invention will be described in a clear and fully understandable way.

It is noted that the described embodiments are merely a portion but not all of the embodiments of the invention. Based on the described embodiments of the invention, those ordinarily skilled in the art can obtain other embodiment(s), which come(s) within the scope sought for protection by the invention.

The purpose of this present disclosure is to provide a display apparatus wherein a camera module is arranged within, and integrated with, a display area of a display module (i.e. display screen).

Figure 1:
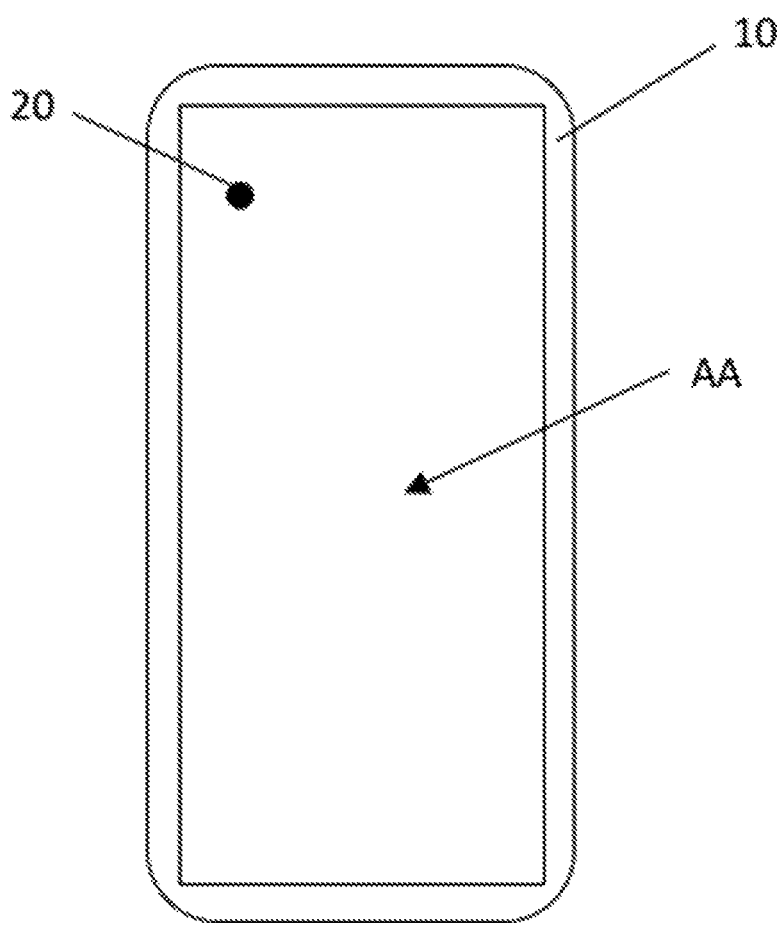
FIG. 1 is a top view of a display apparatus according to some embodiments of the disclosure.

FIG. 1 illustrates top view of a display apparatus according to some embodiments of the disclosure. As shown in FIG. 1, the display apparatus comprises a display module 10 and a camera module 20. The camera module 20 is substantially arranged within a display area AA (shown by the rectangular shape in the figure) of the display module 10. Importantly, in the display apparatus illustrated in FIG. 1, the camera module 001 is integrated with the display module 002, as described below and illustrated in FIG. 2A and FIG. 2B.

Figure 2A:
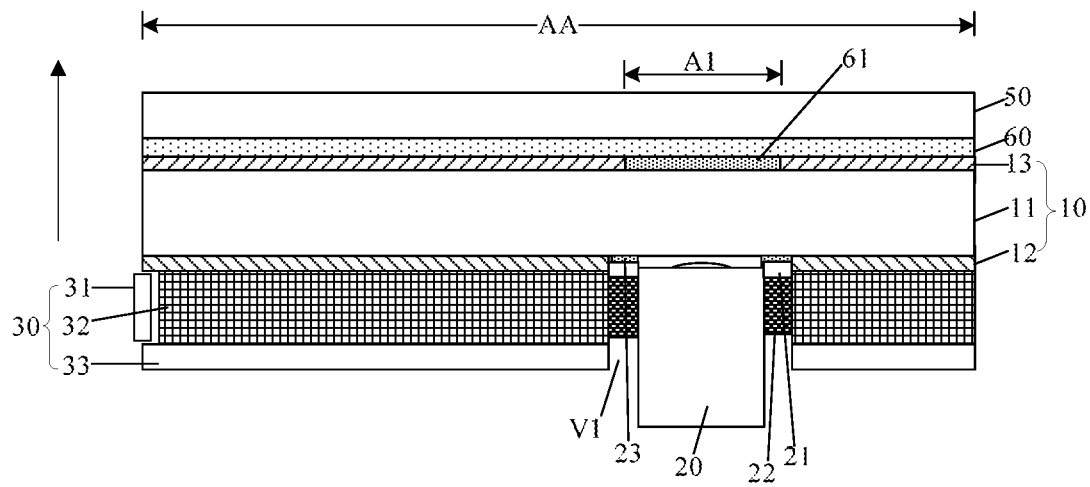
FIG. 2A is a first structural diagram of the display apparatus provided by the present disclosure.
Figure 2B:
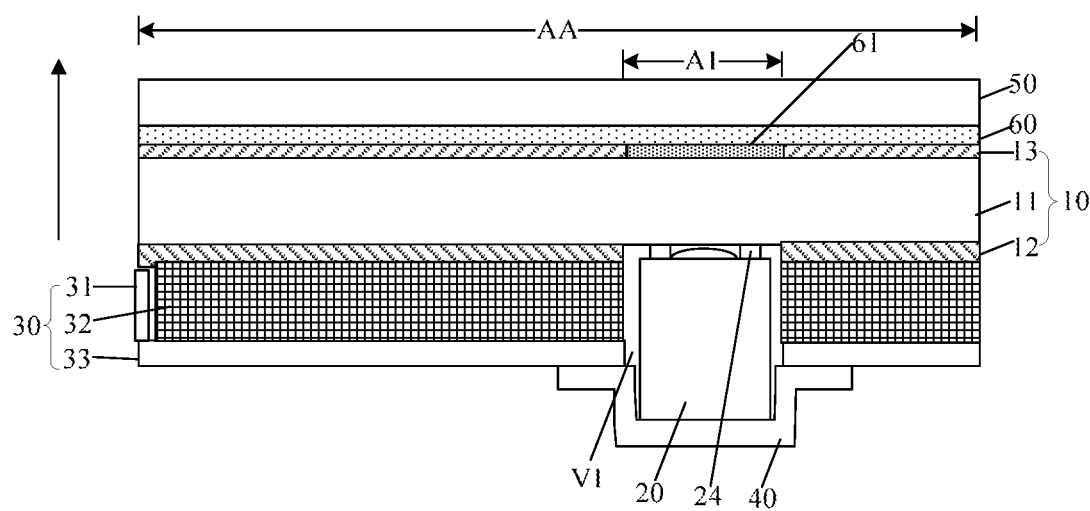
FIG. 2B is a second structural diagram of the display apparatus provided by the present disclosure.

FIG. 2A illustrates a schematic diagram of a structure of a display apparatus disclosed herein according to a first embodiment of the disclosure. FIG. 2B illustrates a schematic diagram of a structure of a display apparatus according to a second embodiment of the disclosure.

As shown in both FIG. 2A and FIG. 2B, the display apparatus comprises a display module 10 and a camera module 20. The camera module 20 is arranged within a display area AA of the display module 10, and it is disposed over a side of the display module 10 that is far from or distal to a light-emitting surface of the display module 10. In the display apparatus as specifically illustrated in both FIG. 2A and FIG. 2B, the light transmission direction is from a bottom to a top (as illustrated by the bottom-to-top arrow in the figures), and the upper side of the display module 10 has the light-emitting surface, and the camera module 20 is disposed below the lower side of the display module 10 in the figures.

The display area AA of the display apparatus comprises a light-incident region A1 that positionally corresponds to a lens of the camera module 20. The light-incident region A1 is configured to allow an environmental light (i.e. the light from an outside environment, such as from a top of the display apparatus) to pass therethrough so as to reach the lens of the camera module 20.

Herein, it should be understood that the display apparatus further comprises other structures such as driving circuits, which can be arranged within a frame region defined by a frame of the display apparatus and can be disposed behind the frame to be thereby shielded. As such, the display area AA of the display module 10 is referred to as an area that is surrounded by the frame region.

The region outside the light-incident region A1 in the display area AA comprises a plurality of pixels, and it is configured such that at least two sides of the light-incident region A1 are next to the plurality of pixels. It should be noted that the light-incident region A1 that positionally corresponds to the lens of the camera module 20 is referred to as that an orthographic projection of the lens of the camera module 20 on the display module 10 and an orthographic projection of the light-incident region 10 on the display module 10 are exactly or substantially matched with each other in size and shape. Herein, considering the manufacturing inaccuracy when assembling the display apparatus, the edge of the light-incident region A1 can slightly exceed the edge of the orthographic projection of the lens of the camera module 20 on the display module 10.

In the display apparatus disclosed herein, the camera module 20 is arranged inside the display area AA of the display apparatus, thus differing from existing display apparatuses where the camera module 20 is typically arranged outside the display module 10, or the display module 10 is cut to arrange the camera module 20 within a groove thus formed that often has an irregular shape.

In the display apparatus disclosed herein, an area occupied by the display area AA of the display module 10 can be relatively larger than that in existing display apparatuses, and as a result, the display apparatus can thus have a larger display screen relative to the whole device.

In addition, because the camera module 20 is disposed over a side of the display module 10 that is far from its light-emitting side, there is no need to conduct irregular-shaped cutting to the display module 10, therefore the problems of low manufacturing efficiency and low yield caused by conducting irregular-shape cutting to the display module 10 can be avoided.

In the present disclosure, the display apparatus is particularly suitable for a liquid crystal display apparatus. Accordingly, in the display apparatus, the aforementioned display module 10 comprises a liquid crystal cell 11, and the display apparatus further comprises a backlight portion 30. The display module 10 is arranged at a light-emitting side of the backlight portion 30.

In order to reduce a thickness of the display apparatus, as shown in both FIG. 2A and FIG. 2B, a mounting hole V1 is configured within the backlight portion 30, and the camera module 20 is arranged inside the mounting hole V1.

Herein, the backlight portion 30 can comprise a backlight source, which comprises a light-emitting component 31 and an optical film group 32. The light-emitting component 31 is arranged at a light-incident side of the optical film group 32, whereas the display module 10 is arranged at a light-emitting side of the optical film group 32. The mounting hole V1 is arranged to pass through the optical film group 32.

Herein, the backlight source can be a side-entry backlight source or a straight-down backlight source. If a straight-down backlight source is adopted, the bottom side of the optical film group 32 is the light-incident side thereof, whereas the upper side of the optical film group 32 is the light-emitting side thereof.

If a side-entry backlight source is adopted, the optical film group 32 can comprise film layers such as a light-guiding plate, a light-diffusing film layer, and a prism. The light-guiding plate has a light-incident side and a light-emitting side, and the film layers including the light-diffusing film layer and the prism can be configured over the light-emitting side of the light-guiding plate. As such, the light-incident side of the optical film group 32 is substantially the light-incident side of the light-guiding plate, and the top side of the optical film group 32 is the light-emitting side.

In the following, with reference to FIG. 2A and FIG. 2B, mounting of the camera module 20 inside the mounting hole V1 of the display apparatus will be described in detail.

According to a first mounting approach of the camera module 20 shown in FIG. 2A, an adhesive portion 22 having a composition of an adhesive glue is arranged between, to thereby bond, the camera module 20 and an inner wall of the mounting hole V1. The camera module 20 is thus mounted inside the mounting hole V1 through the adhesive portion 22. In some preferred embodiments, the adhesive portion 22 is non-transparent, and as a result, the backlight portion 30 will not leak lights at a location of the mounting hole V1 to thereby influence the shooting effect of the camera module 20. Herein, the adhesive portion 22 can comprise an adhesive glue of a dark color such as a black color or a brown color.

As further shown in FIG. 2A, a convex portion 21 is arranged at an end (i.e. the upper end shown in the figure) of the camera module 20 that faces the display module 10. The convex portion 21 extends towards a side wall of the mounting hole V1, a first adhesive layer 23 is arranged between the convex portion 21 and the display module 10. The adhesive portion 22 is arranged at a side of the convex portion 21 that departs from the display module 10.

Herein, the first adhesive layer 23 can comprise a double-sided adhesive. Additionally, the convex portion 21 can be configured to be ring-shaped, as such, the area of the double-sided adhesive can be increased, and the stability of the connection between the camera module 20 and the display module 10 can be increased.

During an assembling process of the display apparatus, the backlight portion 30 and the display module 10 can be assembled together at first. Next, the camera module 20 can be disposed at a pre-set location and can be further assembled with the display module 10 by means of the first adhesive layer 23. Then a non-transparent adhesive glue can be instilled into a space between the camera module 20 and the side wall of the mounting hole V1 to thereby form the adhesive portion 22.

During the above step of instilling the adhesive glue into the space between the camera module 20 and the side wall of the mounting hole V1 to thereby form the adhesive portion 22, because of the presence of the convex portion 21, the adhesive glue is prevented from flowing to a front end of the camera, and the shooting effect of the camera module 20 can thus be ensured.

In addition, the convex portion 21 is further configured to have an upper end thereof higher than an upper end of the lens of the camera module 20. More specifically, it can be configured such that the upper surface of the convex portion 21 has a relatively larger distance to the bottom surface of the display module 10 than the upper surface of the lens of the camera module 20. Such a configuration ensures that the lens of the camera module 20 and the display module 10 do not contact with each other, therefore avoiding the occurrence of wearing of the lens of the camera module 20.

FIG. 2B illustrates a second mounting approach of the camera module 20. As shown in the figure, the backlight portion 30 further comprises a backboard 33. The backboard 33 is arranged at a side of the backlight portion 30 distal to the display module 10, and the mounting hole V1 is configured to pass through both the optical film group 32 and the backboard 33. A mounting component 40 is fixedly mounted onto the backboard 33, and one end of the camera module 20 that is far away from the display module 10 is fixedly attached with the mounting component 40.

Herein, the backboard 33 and the mounting component 40 can both be made of a metal material, and the mounting component 40 can be fixedly mounted onto the backboard 33 by means of welding. The camera module 20 can be fixedly attached with the mounting component 40 by means of gluing.

Further specifically, a mounting slot that corresponds to the camera module 20 can be configured on the mounting component 40. A portion of the camera module 20 can be configured to protrude beyond the backboard 33 along a direction that is away from the display module 10 to thereby extend into the mounting slot.

Herein, in the embodiment illustrated in FIG. 2B, a convex portion 24 can also be arranged at the upper end of the camera module 20. The convex portion 24 can be further arranged at a surrounding area of the camera module 20. The upper end of the convex portion 24 is configured to be higher than the upper end of the lens of the camera module 20. As such, the lens of the camera module 20 will not be in contact with the display module 20 to thus preventing wearing of the lens from occurring. The convex portion 24 can also be attached with the display module 10 by means of gluing (such as by means of the first adhesive layer 23 in the embodiments shown in FIG. 2A).

It should be noted that the mounting approach of the camera module 20 inside the mounting hole V1 is not limited to the approaches as illustrated in FIG. 2A and FIG.

2B. For example, the mounting approaches in FIG. 2A and FIG. 2B can be combined according to some embodiments where the aforementioned mounting component 40 illustrated in FIG. 2B can also be employed in the embodiment illustrated in FIG. 2A. As such, the camera module 20 can be mounted to be assembled though both the adhesive portion 22 and the mounting component 40 at the same time, therefore the mounting effect can be improved.

As described above, the display module 10 comprises the liquid crystal cell 11. In the following, the structure of the display module 10 will be described in detail with reference to FIG. 3, FIG. 4, and FIG. 5.

The liquid crystal cell 11 comprises an array substrate 111 and an opposing substrate 112, which are arranged to face against each other. A liquid crystal layer 113 is arranged between the array substrate 111 and the opposing substrate 112. A first alignment layer 114 is configured between the array substrate 111 and the liquid crystal layer 113, and a second alignment layer 115 is configured between the opposing substrate 112 and the liquid crystal layer 113. In other words, the array substrate 111, the first alignment layer 114, the liquid crystal layer 113, the second alignment layer 115, and the opposing substrate 112 are sequentially stacked in the liquid crystal cell 11, as illustrated in a bottom-to-top direction in each of FIGS. 3-5.

Herein, the array substrate 111 can comprise a first base substrate 111a, and a display component layer 111b over the first base substrate 111a. The display component layer 111b is specifically arranged over a side of the first base substrate 111a that faces the liquid crystal layer 113.

The display component layer 111b can comprise a film layer that is related to display. Specifically, display component layer 111b can comprise a thin film transistor layer (including a gate electrode layer, a gate insulating layer, an active layer and a source-drain electrode layer, and so on), an inter-layer insulating layer, a passivation layer, and a planarization layer. In order to prevent the display component layer 111b from influencing the strength of the light obtained by the camera module 20, in some embodiments, as shown in FIG. 3, FIG. 4 and FIG. 5, the display component layer 111b is configured at a region outside the light-incident region A1.

The opposing substrate 112 can comprise a second base substrate 112a, and can further comprise, over the second base substrate 112a, a light filter layer 112b, a black matrix 112c, and a transparent protection layer 112d. The transparent protection layer 112d can be configured to cover the whole display area AA. The light filter layer 112b and the black matrix 112c are both arranged between the transparent protection layer 112d and the second base substrate 112a.

According to some preferred embodiments of the display apparatus, the light filter layer 112b and the black matrix 112c can be both arranged within a region of the display area AA outside the light-incident region A1, so that the camera module 20 can obtain images whose color is the same as the real color of the objects in the environment.

Figure 3:
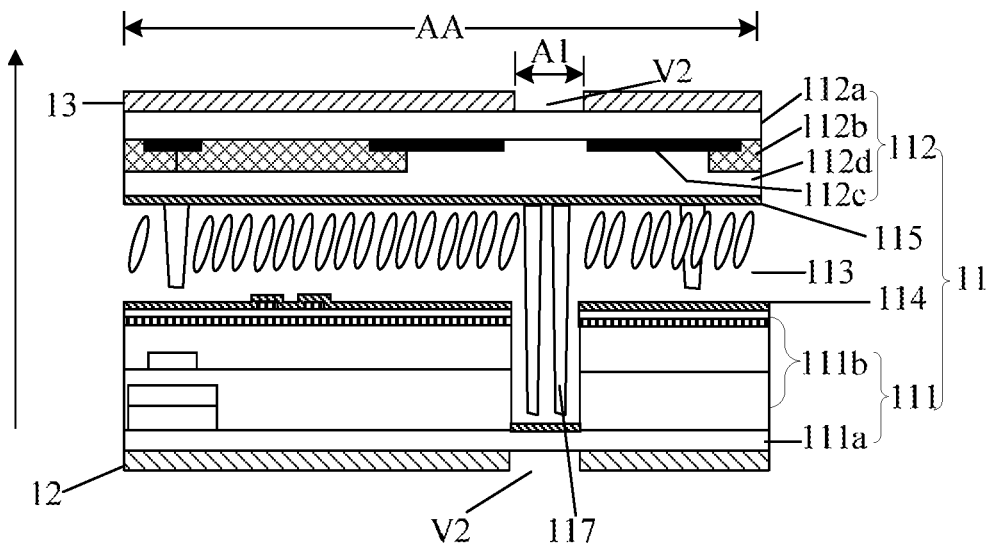
FIG. 3 is a first structural diagram of the display module provided by the present disclosure.
Figure 4:
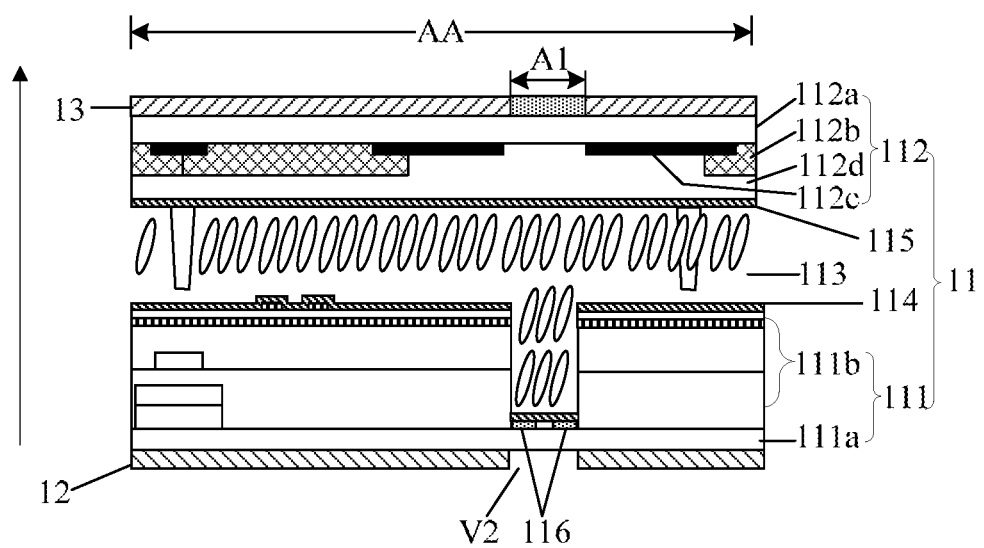
FIG. 4 is a second structural diagram of the display module provided by the present disclosure.
Figure 5:
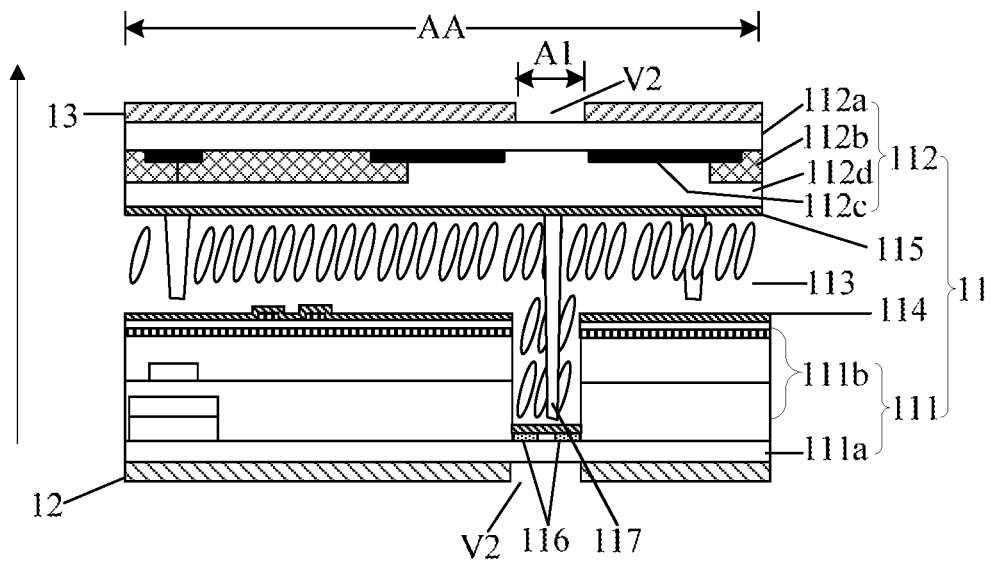
FIG. 5 is a third structural diagram of the display module provided by the present disclosure.

FIGS. 3-5 respectively illustrates a structure of the display module 10 according to three embodiments of the disclosure (i.e. a first embodiment, a second embodiment, and a third embodiment, corresponding respectively to FIG. 3, FIG. 4, and FIG. 5).

In the first embodiment of the display module 10 shown in FIG. 3, the liquid crystal layer 113 is arranged at a region of the display area AA outside the light-incident region A1, whereas the first alignment layer 114 and the second alignment layer 115 are both configured to cover the whole display area AA.

In the second embodiment and the third embodiment of the display module 10 as respectively shown in FIG. 4 and FIG. 5, the liquid crystal layer 113 is configured to cover the whole display area AA, just as the first alignment layer 114 and the second alignment layer 115.

With reference to FIG. 4 and FIG. 5, in both the second embodiment and the third embodiment of the display module 10, the display module 10 can further comprise a driving electrode layer 116 that is arranged within the light-incident region A1. The driving electrode layer 116 is configured to generate an electric field in a portion of the liquid crystal layer 113 that positionally corresponds to the light-incident region A1. The electric field generated thereby can in turn drive the liquid crystal molecules of the portion of the liquid crystal layer 113 positionally corresponding to the light-incident region A1 to deflect, therefore adjusting an angle of lights that enter the lens of the camera module 20 to thereby realize zooming of the lens of the camera module 20.

Herein, depending on different embodiments of the disclosure, the driving electrode layer 116 can be arranged over the array substrate 111, over the opposing substrate 112, or partially over the array substrate 111 and partially over the opposing substrate 112.

In the embodiments of the display apparatus where the display component layer 111b is arranged outside the light-incident region A1, within the light-incident region A1, it can be configured such that only the driving electrode layer 116, the first alignment layer 114, the second alignment layer 115, the liquid crystal layer 113, the transparent protection layer 112d, and signal lines (not shown in the figures) for providing signals to the driving electrode layer 116 are arranged between the first base substrate 111a and the second base substrate 112a.

The display module 10 further comprises pixel electrodes and common electrodes in the display area AA, which can be arranged outside the light-incident region A1 to thereby generate electric fields for display outside the light-incident region A1. According to some embodiments, the electric field generated by the driving electrode layer 116 in the light-incident region A1 and the electric fields generated by the pixel electrodes and common electrodes at other regions of the display area AA are configured to be independent from each other, such that the zooming process for the camera module 20 and the displaying process of the display module 10 do not influence each other.

In addition, in order to maintain the thickness of the liquid crystal cell, in some embodiments shown in both FIG. 3 and FIG. 5, a transparent spacer 117 is arranged between the array substrate 111 and the opposing substrate 112 within the light-incident region A1.

Further, as illustrated in FIGS. 1-5, the display module 10 further comprises a first polarizer 12 and a second polarizer 13. The second polarizer 12 is arranged over a side of the array substrate 111 that departs from the opposing substrate 112, and the second polarizer is arranged over a side of the opposing substrate 112 that departs from the array substrate 111. It is further configured such that a transmission axis of the first polarizer 12 and a transmission axis of the second polarizer 13 are substantially perpendicular to each other.

As further shown in FIG. 2A and FIG. 2B, a cover plate 50 can be further arranged over a side of the second polarizer 13 that departs from the opposing substrate 112, and a second adhesive layer 60 is arranged between the cover plate 50 and the second polarizer 13.

Figure 6:
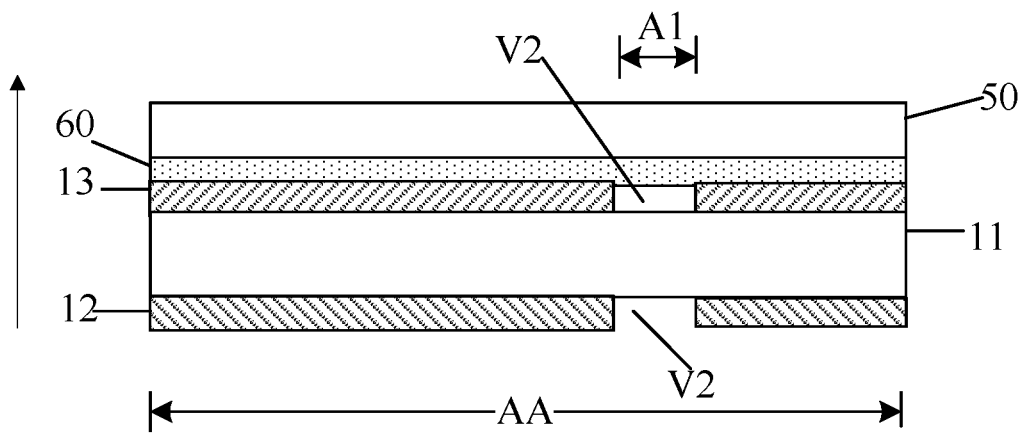
FIG. 6 and FIG. 7 are diagrams respectively illustrating the two bonding states of the display module and the cover plate.
Figure 7:
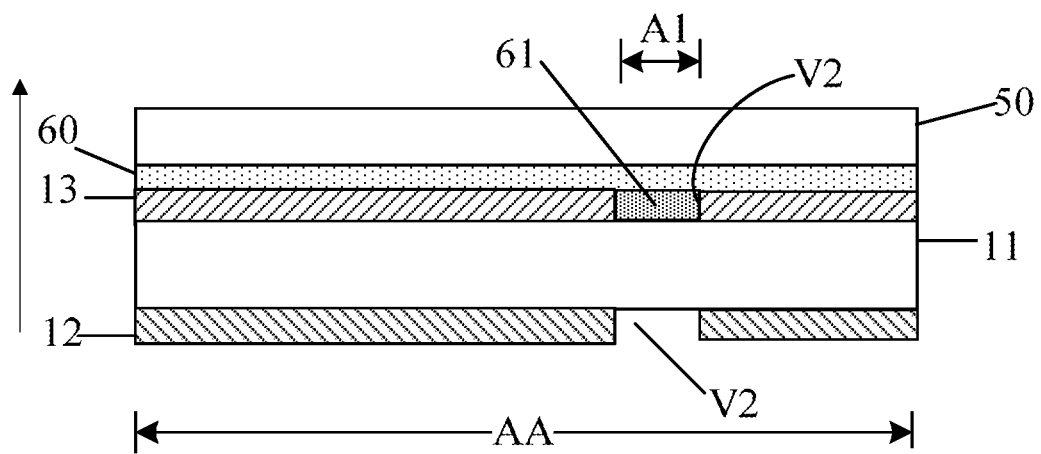

FIG. 6 and FIG. 7 respectively illustrate the bonding between the display module 10 and the cover plate 50 according to two embodiments of the disclosure. In the embodiment shown in FIG. 6, a light-transmissive opening V2 is arranged both in the first polarizer 12 at a position corresponding to the light-incident region A1 and in the second polarizer 13 at a position corresponding to the light-incident region A1. As such, when the lights from the environment pass through the light-transmissive opening V2 in the first polarizer 12 and the light-transmissive opening V2 in the second polarizer 13, the polarization states do not change. Thus the brightness of the lights will not be reduced, and thus the brightness of the lights received by the camera module 20 will be improved and the shooting effect will also be improved.

Optionally, one or both of the light-transmissive opening V2 in the first polarizer 12 and the light-transmissive opening V2 in the second polarizer 13 can be further filled with a transparent film layer 61. According to some preferred embodiments shown in FIGS. 1, 2 and 7, the light-transmissive opening V2 in the second polarizer 13 is filled with the transparent film layer 61. This configuration can prevent an air layer from being formed between the cover plate 50 and the opposing substrate 112. The air layer thus formed can negatively influence the shooting effect.

In the manufacturing process, the second adhesive layer 60 and the cover plate 50 can be first bonded together. Next, the second polarizer 13 and the opposing substrate 112 can be bonded together, and the transparent film layer 61 can be filled into the light-transmissive opening V2. Then, the cover plate 50 that is boned with the second adhesive layer 60 can be further bonded with the second polarizer 13 that is bonded with the opposing substrate 112.

Herein, the transparent film layer 61 can comprise a transparent adhesive or comprise a film layer made of a solidified transparent liquid. Specifically, the material of the transparent film layer 61 can be same as the material of the second adhesive layer 60.

It is noted that in addition to the above mentioned embodiments where a light-transmissive opening V2, filled with or without a transparent film layer 61, is arranged in both the first polarizer 12 and the second polarizer 13 and at positions corresponding to the light-incident region A1 to thereby allow the lights from the outside environment to pass through the first polarizer 12 and the second polarizer 13 to ultimately enter the lens of the camera module 20 without block, according to some other embodiments of the disclosure, each of the first polarizer 12 and the second polarizer 13 can be configured to have a portion thereof that positionally corresponds to the light-incident region A1 is light-transmissive.

In other words, instead of having a light-transmissive opening V2 (i.e. a though hole absent of the polarizer material), each of the first polarizer 12 and the second polarizer 13 can have a light-transmissive portion (i.e. comprising a material that is integrated with other portions of the polarizer yet is transparent or light-transmissive) to thereby allow the environmental lights to pass therethrough to thereby be able to enter the lens of the camera module 20.

In order to process the above structure, a polarizer (i.e. the first polarizer 12 or the second polarizer 13) can be first disposed to cover the whole display area AA. Then, a laser processing can be conducted over a portion of the polarizer that positionally corresponds to the light-incident region A1, such that the portion of the polarizer does not change the polarization state of the lights.

In the display apparatus disclosed herein, the camera module is still arranged in the display region of the display module. As a result, the area the display screen occupied in the display apparatus can be increased (in some example, the percentage of the display screen in the display apparatus can be more than 93%).

In addition, the camera module is arranged over a side of the display module that is far away from its light-emitting side. Therefore there is no need to conduct irregular-shaped cutting over the display module, and in turn, the problems of low yield and low production efficiency caused by irregular-shaped cutting can thus be avoided.

Furthermore, a driving electrode layer can be arranged within a region of the liquid crystal cell that positionally corresponds to the lens of the camera module. The driving electrode layer can drive the liquid crystal molecules to deflect, which can change the incident angle of the light entering the lens of the camera module, thereby realizing zooming of the lens of the camera module.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures.

The invention claimed is:

1. A display apparatus, comprising:
   a display module;
   a camera module;
   a backlight portion being provided on a side of the display module being opposite from a light-emitting surface of the display module, the backlight portion including a backboard, the backboard being provided at a side of the backlight portion being opposite from the display module; and
   a mounting component fixedly attached onto the backboard;
   wherein:
   the camera module is within a display area of the display module;
   the camera module is over a side of the display module distal to a light-emitting surface of the display module; and
   the display area of the display module comprises a light-incident region positionally corresponding to a lens of the camera module, wherein the light-incident region is configured to allow lights from a side of the display apparatus proximal to the light-emitting surface of the display module to pass therethrough to thereby enter the lens of the camera module;
   the camera module extends through a mounting hole, the mounting hole extending through the backlight portion;
   the mounting component forms a cavity extending away from an opposing surface of the backboard being opposite from the display module, and wherein the end portion of the camera module extends into the cavity, wherein the camera module is attached to the mounting component within the cavity.

2. The display apparatus of claim 1, wherein the camera module further comprises a convex portion at an end of the camera module facing the display module, wherein the convex portion is configured to ensure that the lens of the camera module has a distance to the display module.

3. The display apparatus of claim 2, wherein the convex portion comprises a ring having an opening thereof positionally corresponding to the lens of the camera module, wherein the opening is configured to allow the lights passing through the light-incident region of the display module to pass therethrough to thereby enter the lens of the camera module.

4. The display apparatus of claim 1, further comprising an adhesive portion between the camera module and a side wall of the mounting hole.

5. The display apparatus of claim 4, wherein the adhesive portion is non-light-transmissive.

6. The display apparatus of claim 2, further comprising a first adhesive layer between the convex portion and the display module.

7. The display apparatus of claim 1, wherein the display module comprises a liquid crystal cell, wherein the liquid crystal cell comprises an array substrate, a liquid crystal layer, and an opposing substrate, sequentially stacked over one another along a direction of light transmission.

8. The display apparatus of claim 7, wherein the liquid crystal layer covers regions of the display areas other than the light-incident region.

9. The display apparatus of claim 7, wherein the liquid crystal layer covers the light-incident region.

10. The display apparatus of claim 9, wherein the display module further comprises a driving electrode layer at a position of the liquid crystal cell corresponding to the light-incident region, wherein:
the driving electrode layer is configured to generate an electric field in a portion of the liquid crystal layer positionally corresponding to the light-incident region to drive liquid crystal molecules in said portion of the liquid crystal layer to deflect to thereby realize a zooming of the lens of the camera module.

11. The display apparatus of claim 10, wherein the electric field generated by the driving electrode layer is independent from any of electric fields generated in portions of the liquid crystal layer positionally corresponding to regions of the display area other than the light-incident region.

12. The display apparatus of claim 7, wherein the display module further comprises:
a first alignment layer between the array substrate and the liquid crystal layer; and
a second alignment layer between the opposing substrate and the liquid crystal layer.

13. The display apparatus of claim 7, wherein the liquid crystal cell further comprises a transparent spacer between the array substrate and the opposing substrate, wherein:
the transparent spacer is arranged to positionally correspond to the light-incident region.

14. The display apparatus of claim 7, wherein the liquid crystal cell further comprises a transparent spacer between the array substrate and the opposing substrate, wherein:
the transparent spacer is absent in the light-incident region.

15. The display apparatus of claim 7, wherein the liquid crystal cell further comprises:
a first polarizer over a side of the array substrate distal to the opposing substrate; and
a second polarizer over a side of the opposing substrate distal to the array substrate;
wherein:
the first polarizer is provided with a first light-transmissive window at a position thereof corresponding to the light-incident region; and
the second polarizer is provided with a second light-transmissive window at a position thereof corresponding to the light-incident region.

16. The display apparatus of claim 15, wherein at least one of the first light-transmissive window and the second light-transmissive window comprises a light-transmissive opening.

17. The display apparatus of claim 15, wherein at least one of the first light-transmissive window and the second light-transmissive window comprises a light-transmissive material.

* * * * *